(12) United States Patent
Kato et al.

(10) Patent No.: US 7,607,688 B2
(45) Date of Patent: Oct. 27, 2009

(54) RUPTURABLE MEMBER

(75) Inventors: Kazuhiro Kato, Hyogo (JP); Shingo Oda, Himeji (JP); Hirotoshi Niwa, Himeji (JP); Yuji Kurihara, Osaka (JP)

(73) Assignee: Daicel Chemical Industries, Ltd., Osaka (JP)

( * ) Notice: Subject to any disclaimer, the term of this patent is extended or adjusted under 35 U.S.C. 154(b) by 256 days.

(21) Appl. No.: 11/063,586

(22) Filed: Feb. 24, 2005

(65) Prior Publication Data
US 2005/0206145 A1    Sep. 22, 2005

Related U.S. Application Data

(60) Provisional application No. 60/548,863, filed on Mar. 2, 2004.

(30) Foreign Application Priority Data

Feb. 25, 2004    (JP) .............................. 2004-050112

(51) Int. Cl.
*B60R 21/026* (2006.01)
(52) U.S. Cl. .................... 280/737; 280/741; 137/68.27
(58) Field of Classification Search ................ 280/737, 280/736, 741; 137/68.27; 102/202.14; 220/89.2
See application file for complete search history.

(56) References Cited

U.S. PATENT DOCUMENTS

| | | | | |
|---|---|---|---|---|
| 2,199,519 A | * | 5/1940 | Collins et al. .......... 220/203.08 |
| 2,380,964 A | * | 8/1945 | Grover ....................... 220/89.2 |
| 2,576,431 A | * | 11/1951 | White ........................ 220/89.2 |
| 3,091,359 A | * | 5/1963 | Wood ......................... 220/89.2 |
| 3,121,509 A | * | 2/1964 | Porter ........................ 220/89.2 |
| 3,363,801 A | | 1/1968 | Fike | |
| 3,445,032 A | * | 5/1969 | Raidl, Jr. et al. ........... 220/89.2 |
| 3,460,853 A | * | 8/1969 | Chute ......................... 280/737 |
| 3,567,245 A | * | 3/1971 | Ekstrom ...................... 280/737 |
| 3,704,807 A | * | 12/1972 | Lidgard ..................... 220/89.2 |
| 3,878,440 A | * | 4/1975 | Ando .......................... 361/521 |
| 3,968,980 A | * | 7/1976 | Hay ........................... 280/734 |
| 4,347,942 A | * | 9/1982 | Jernberg et al. ............ 220/89.2 |
| 4,484,691 A | * | 11/1984 | Lees .......................... 220/89.2 |
| 4,662,126 A | * | 5/1987 | Malcolm ................... 52/167.9 |
| 4,738,372 A | * | 4/1988 | Jernberg .................... 220/89.2 |
| 4,905,722 A | | 3/1990 | Rooker et al. | |
| 4,949,862 A | * | 8/1990 | Barbarits et al. .......... 220/89.2 |
| 5,002,085 A | * | 3/1991 | FitzGerald ............... 137/68.27 |

(Continued)

FOREIGN PATENT DOCUMENTS

FR    2729450 A    7/1996

(Continued)

*Primary Examiner*—Paul N. Dickson
*Assistant Examiner*—Timothy Wilhelm
(74) *Attorney, Agent, or Firm*—Birch, Stewart, Kolasch & Birch, LLP

(57) ABSTRACT

A rupturable member in which the rupturing manner thereof can be controlled, and a gas generator using the rupturable member are provided. A fragile portion that ruptures preferentially and regulates the rupturing direction of the rupturable member is formed, the rupturable member being provided with a stress dispersion portion formed in a shape or structure to disperse stress when the rupturable member is ruptured, in the tip end of the fragile portion or forward for the rupturing direction of the fragile portion.

2 Claims, 7 Drawing Sheets

U.S. PATENT DOCUMENTS

| | | | |
|---|---|---|---|
| 5,022,424 A * | 6/1991 | Reynolds et al. | 137/68.27 |
| 5,346,251 A * | 9/1994 | Burnard et al. | 280/737 |
| 5,377,716 A * | 1/1995 | Farwell et al. | 137/68.27 |
| 5,494,312 A * | 2/1996 | Rink | 280/737 |
| 5,499,649 A * | 3/1996 | Tomasko et al. | 137/68.27 |
| 5,529,333 A * | 6/1996 | Rizzi et al. | 280/737 |
| 5,531,473 A * | 7/1996 | Rink et al. | 280/737 |
| 5,564,272 A * | 10/1996 | Warner et al. | 60/223 |
| 5,631,634 A * | 5/1997 | Strelow | 340/626 |
| 5,632,505 A * | 5/1997 | Saccone et al. | 280/737 |
| 5,803,492 A | 9/1998 | Rink et al. | |
| 6,116,642 A * | 9/2000 | Shirk et al. | 280/737 |
| 6,142,511 A * | 11/2000 | Lewis | 280/733 |
| 6,145,877 A * | 11/2000 | Rink et al. | 280/737 |
| 6,286,702 B1* | 9/2001 | Buermann | 220/229 |
| 6,357,792 B1* | 3/2002 | Shirk et al. | 280/737 |
| 6,471,082 B1* | 10/2002 | Fritzinger | 220/203.08 |
| 6,589,687 B1* | 7/2003 | Konno et al. | 429/56 |
| 6,607,003 B1* | 8/2003 | Wilson | 137/68.23 |
| 6,786,507 B2* | 9/2004 | Dolling et al. | 280/737 |
| 6,792,964 B2* | 9/2004 | Farwell et al. | 137/68.25 |
| 6,823,796 B1* | 11/2004 | Amano | 102/202.14 |
| 6,979,021 B2* | 12/2005 | Young et al. | 280/737 |
| 7,007,610 B2* | 3/2006 | Karlin et al. | 102/531 |
| 7,017,767 B2* | 3/2006 | Eijkelenberg et al. | 220/89.2 |
| 7,032,925 B2* | 4/2006 | Iwai et al. | 280/737 |
| 7,125,041 B2* | 10/2006 | Kato et al. | 280/736 |
| 7,156,257 B2* | 1/2007 | de la Serna | 222/5 |
| 2003/0029349 A1 | 2/2003 | Katsuda et al. | |
| 2005/0126416 A1* | 6/2005 | Clark | 102/202.12 |
| 2005/0189753 A1* | 9/2005 | Kato et al. | 280/741 |
| 2005/0230950 A1* | 10/2005 | Fischer et al. | 280/737 |
| 2005/0242556 A1* | 11/2005 | Katsuda et al. | 280/737 |
| 2006/0087106 A1* | 4/2006 | Young et al. | 280/741 |

FOREIGN PATENT DOCUMENTS

| | | |
|---|---|---|
| JP | 47-021774 | 7/1972 |
| JP | 59-197680 A | 11/1984 |
| JP | 7-215161 | 8/1995 |
| JP | 2002-255006 A | 9/2002 |
| WO | WO-02/059511 A2 | 8/2002 |

* cited by examiner

RUPTURABLE MEMBER

This Nonprovisional application claims priority under 35 U.S.C. § 119(e) on U.S. Provisional Application No. 60/548,863 filed on Mar. 2, 2004 and under 35 U.S.C. § 119(a) on Patent Application No. 2004-50112 filed in Japan on Feb. 25, 2004, the entire contents of which are hereby incorporated by reference.

BACKGROUND OF THE INVENTION

1. Field of the Invention

The present invention relates to a rupturable member that ruptures due to pressure or an impact wave, and more particularly relates to a rupturable member in which reproducibility of the rupturing manner is improved, and that designed rupturing and stable rupturing can be reliably performed.

2. Description of the Related Art

Rupturable members, formed of thin metals, that rupture by generated pressure or an impact wave are used in a large number of apparatus in which, for example, explosives, pressurized fluids and various members are utilized. Examples of devices formed using explosives include a variety of gas generators mounted in automobiles such as gas generators for air bags and gas generators for pretensioners, and in these devices too, rupturable members that rupture as a result of the activation of an igniter which constitutes an activation initiating device or as a result of pressure or an impact wave generated by the combustion of a gas generating agent to generate a gas are used.

In such gas generators for airbags, a gas generating agent for generating a flame or gas due to combustion is used, and these gas generating agents, for the purpose of protection from humidity, are, in some cases, stored in a thin can formed of a metal such as aluminum or stainless steel. In addition, in hybrid gas generators or pressurized gas generators using a pressurized gas or the like, in general, a rupturable plate formed from a metal such as aluminum or stainless steel is attached to the gas discharge hole in order to seal the pressurized gas.

The thin can and rupturable plate described above are ruptured and opened as a result of pressure increase or an impact wave generated inside the can or inside sealed by the rupturable member, the ruptured shape of the can or rupture plate and the generated fragments can be hardly reproductive and is difficult to predict. And, there is a possibility that the fragments produced by the opening and rupturing of the can or rupturable plate will block the gas passage and destabilize performance of the gas generator, or an airbag device or a seat belt pretensioner using the gas generator.

Thereupon, with a view of resolving these problems, the provision of a notch or slit in the above rupturable plate has been considered. JP-A No. 2002-255006 is one example of a patent document pertaining thereto, and in this publication, the provision of a cross-shaped notch in the rupturable plate used for sealing the pressurized gas.

However, if a notch or a fragile portion is provided in the rupturable plate, crack may occur and the rupturable plate may rupture with this as the point of origin, and sometimes, the break thereof may extend to sections in which no notch is provided. That is, if a cross-shaped notch is provided in the center of a rupturable plate in which the perimeter edge is fixed, the rupturing of the rupturable plate may extend to the outer perimeter edge of the rupturable plate beyond the tip ends of the notch, and consequently, the fine fragments may be produced and block the gas passage.

U.S. Pat. No. 5,803,492 shows, in FIGS. 8 and 9, a housing selectively pre-weakened for an air bag inflator.

SUMMARY OF THE INVENTION

The present invention provides a rupturable member adapted to be ruptured by pressure, an impact wave or the like, which is the rupturable member in that unreproductive rupturing or unintended rupturing (rupturing beyond the tip end of the notch) does not occur, a rupturing manner of the rupturable member being optionally controlled and the reproductivity and stability in the rupturing manner is improved, and the rupturable member in which no fine fragments is generated due to rupturing and that does not block a gas flow passage even when disposed in a variety of gas generators such as for an air bag or for a pretensioner but realizes a stable performance of the gas generators, and also provides a gas generator using the same.

As a result of earnest study with a view to resolving the above problems, by focusing their attention on the fact that rupturing beyond the tip ends of the notch of the rupturable portion in the conventional art is generated due to the concentration of stresses in the tip end sections of the notch, the inventors of the present invention discovered a shape of a notch and the like in which no concentration of stresses occurred, thereby completing the present invention.

The invention provides a rupturable member that ruptures due to pressure or an impact wave, having a fragile portion that ruptures preferentially and regulates the rupturing direction of the rupturable member, and a stress dispersion portion, formed in a shape or structure to disperse stress during the rupturing of the rupturable member, in the tip end of the fragile portion or forward for the rupturing direction of the fragile portion.

That is, the present invention provides a rupturable member that ruptures due to pressure or an impact wave, wherein a fragile portion that ruptures preferentially and regulates the rupturing direction of the rupturable member is formed in the rupturable member, and a stress dispersion portion, formed in a shape or structure to disperse stress of the rupturing of the rupturable member, is provided in the tip end of the fragile portion or forward for the rupturing direction of the fragile portion.

The stress dispersion portion may be provided, to disperse stress of the rupturing of the rupturable member, forward of the fragile portion in the rupturing direction.

The stress may be caused by the rupturing or take place in the rupturing. Preferably, the present invention provides a gas generator mounted in an automobile for discharging a gas upon impact, wherein the gas generator comprising a rupturable member that, during the activation thereof, ruptures due to pressure or an impact wave to discharge a gas, and the rupturable member of the present invention is used as the rupturable member.

In such a rupturable member, when the rupturable member ruptures due to pressure or an impact wave or the like, the rupturing thereof initiates from the fragile portion, except for the later described case in which the rupturing initiates from the stress dispersal portion, and a stress dispersion portion for dispersing the stress concentrated along the fragile portion is provided either in the tip end of the fragile portion or forward for the rupturing direction of the fragile portion and thereby, rupturing of the rupturable member beyond the stress dispersion portion can be avoided. In other words, the stress dispersion portion disperses the stress that ruptures the rupturable member whereby the concentration thereof can be eliminated. In this way, in the rupturable member according to the present invention, unintended rupturing can be avoided by the presence of the stress dispersion portion and, as a result, the generation of fragments of the rupturable member can be also avoided.

There is an additional concern that, if such a stress dispersion portion were not provided in the rupturable member and the rupturable member were to rupture beyond the fragile portion of the rupturable member, the gas discharged from the ruptured section will affect other component part or members provided in sections (that is, the unintended ruptured sections) other than the fragile portion of the rupturable member. However, as described above, because such unintended rupturing beyond the fragile portion does not occur with the use of the present invention, there is no need to concern the effect of pressure or the like on other component parts or members and, accordingly, the degree of freedom of the design can be improved and the rupturing manner and so on of the rupturable member can be controlled.

The rupturable member according to the present invention described above can be used in a variety of gas generators such as for airbags and for seat belt pretensioners and the like, and is particularly useful in gas generators mounted in automobiles where stable operation is demanded. However, not only is the rupturable member according to the present invention used in gas generators for occupant-restraining devices mounted on automobiles, it can also be used as a rupturable member for devices or the like comprising a member to produce rupturing.

The above fragile portion is a section, in a portion subjected to the pressure of a gas or other fluid or an impact wave, that ruptures by a pressure or an impact wave prior to other section (excluding the stress dispersion portion where the rupturing is initiated from the later-described stress dispersion portion) of the rupturable member, that is, the fragile portion is formed as the most fragile portion with respect to pressure or an impact wave to rupture first. The fragile portion can be obtained by making the thickness of part of the rupturable member thinner, for example, it can be formed as a slit or a notch or the like that does not penetrate the rupturable member. Further, it can be obtained by forming a slit or opening that penetrates the rupturable member and then closing the slit or opening with a member to be easily ruptured or removed. Because the fragile portion ruptures prior to other portion of the rupturable member, the rupturing of the rupturable member occurs along (or accompanying) the fragile portion. Although it is preferable that the fragile portion be formed to allow for the prediction or regulation of the rupturing direction of the rupturable member by forming the fragile portion in a linear shape such as a straight line, curved line or bent line, provided the rupturing direction is predictable on the basis of the thickness and material used for the rupturable member and the depth and length of the fragile portion, the fragile portion may be formed in a shape other than a linear shape and with a degree of thickness (for example, triangle, rectangle, other polygon or ellipse).

Further, preferably, the stress dispersion portion is formed in a circular shape with reduced thickness, and the thickness of the stress dispersion portion is formed to be less than the thickness of the base surface of the fragile portion.

The above stress dispersion portion is to disperses at least the stress concentrated on the above fragile portion, that is, the stress for rupturing the rupturable member, and it can be obtained by, for example, making a thickness of the rupturable member thinner in a circular shape or alternatively by making a thickness of the rupturable member thicker such as to enclose and block the portion existing forward for the rupturing direction of the rupturable member. Particularly, in a stress dispersion portion in which the thickness of the rupturable member is formed thinner in a circular shape, the thickness of the stress dispersion portion can be formed to be the same as or even thinner than the thickness of the base surface of the above fragile portion, that is, the same as or even thinner than the thickness of the thinnest formed section of the fragile portion, and it is preferably formed thinner than the thinnest section of the fragile portion. With this formation, since the rupturing of the rupturable member initiates from the stress dispersion portion formed as the thinnest section, rupturing that progresses along the fragile portion will not progress beyond this section.

The stress dispersion portion is formed either in the tip end of the above fragile portion or forward for the rupturing direction of the fragile portion. That is, because the rupturing of the rupturable member progresses along the above fragile portion, the stress dispersion portion for blocking the rupturing is formed either in the tip end of the fragile portion which constitutes the tip end to which the rupturing progresses or forward for the rupturing direction of the fragile portion. Here, the tip end of the fragile portion refers to the tip end in the length direction of a linear-shaped fragile portion and a stress dispersion portion is linked to the linear-shaped fragile portion. And, "forward for the rupturing direction of the fragile portion" indicates a position or section in the rupturing direction, having a certain interval from the end portion in the length direction of a linear-shape fragile portion, and also a position or section which is the end of the rupturing (includes a contacting portion with the fragile portion) in the direction in which the rupturing is generated, in a fragile portion which is not restricted to a linear shape but formed in a variety of shapes. That is, "forward for the rupturing direction of the fragile portion" refers to a position or section where the rupturing extending along the fragile portion reaches without failing.

Preferably, the fragile portion is formed in a linear shape, and the stress dispersion portion is provided in both ends in the length direction of the fragile portion formed in a linear shape.

When the above fragile portion is formed in a linear shape, and in particular, when it is formed in a straight line or curved line, it is preferable that the above stress dispersion portion be formed in both ends in the length direction of the linear-shape fragile portion. If formed in this way, a situation in which the energy of the rupturing blocked at one end in the longitudinal direction causes the rupturing of the other end side can be eliminated.

Preferably, the rupturable member is formed in a flat plate shape, spherical or curved surface shape, and the fragile portion is formed in at least one of the upper surface or rear surface of the rupturable member formed in the flat plate or spherical shape.

The above rupturable member can be formed in a flat plate shape, spherical or curved surface shape (curved flat surface shapes and so on) and, in these cases, the above fragile portion is formed in either the upper surface or rear surface of the rupturable member formed in the flat plate, spherical or curved shape (curved flat surface shapes and so on). A rupturable member formed in this way can be optimally used, for example, as a member for closing a gas flow passage in a gas generator, more specifically, a rupturable member for blocking a pressurized gas in a gas generator using a pressurized gas (such as a pressurized gas generator or a hybrid gas generator).

Preferably, the rupturable member is formed as a hollow cylindrical body in which one end or both ends are closed, and the fragile portion is formed in the side wall of the rupturable member formed as a hollow cylindrical body.

The above rupturable member can be formed as a hollow cylindrical body in which one end or both ends are closed and, in this case, the above fragile portion can be formed in the side wall of the rupturable member formed as a hollow cylindrical body.

A rupturable member formed in this way can be used optimally as a member for discharging a gas generated in the hollow portion in activation, or more specifically, as a container for storing the gas generating agent burned to generate a gas, that is, as a container comprising the function of a rupturable member.

The rupturable members formed in this way can be used optimally, in particular, in a gas generator mounted in an automobile that discharges gas upon the impact. Such rupturable members constitute a component member of a gas generator and is used as a rupturable member that ruptures due to pressure or an impact wave generated in the operation of the gas generator and discharges gas, and by using the rupturable member according to the present invention, the gas generator of the present invention can be obtained.

More specifically, the present invention provides a gas generator which inflates an occupant-restraint air bag, which is a gas generator (for example, a pressurized gas generator using only a pressurized gas, or a hybrid gas generator using both of a pressurized gas and a gas generating agent) in that a pressurized gas is sealed inside a housing, a gas discharge port is closed by a rupturable plate (that is, the rupturable member) and a gas is discharged by rupturing the rupturable plate at the activation of the igniter, wherein the rupturable plate is the rupturable member according to the present invention. Also, the present invention provides a gas generator which inflates an occupant-holding air bag, which is a gas generator (for example, a pyrotechnic gas generator) in that a gas generating agent to generate a combustion gas by combustion inside the housing, a retaining member accommodating and retaining the gas generating agent and an igniting means for igniting and burning the gas generating agent are all disposed, wherein the rupturable member according to the present invention is used as the retaining member.

Furthermore, the present invention provides a gas generator comprising an igniter assembly in which an igniter functioning as an activation initiation means is held by an igniter collar member, a gas generating agent ignited upon the activation of the igniter to generate a gas and a hollow cylindrical cup-like member that accommodates the gas generating agent and is closed at one end and at the other end is joined to the igniter collar member of the igniter assembly body, wherein the rupturable member according to the present invention is used as the cup-like member.

In such a gas generator according to the present invention, since the rupturing manner of the rupturable member used as the rupturable plate or the retaining member can be controlled, the gas generator with a stable output performance can be obtained.

More particularly, in a gas generator using the above rupturable member of the present invention as the cup-like member for retaining the gas generating agent, it is preferable that the fragile portion provided in the rupturable member (cup-like member) is a notch formed in the side-wall portion of the cup-like member formed as a hollow cylindrical body. The notch can be formed to extend in the axial direction of the cup-like member, or alternatively, the notch can be formed also in an intermittent or zigzag way in the circumferential direction of the cup-like member. Further, such a notch may be formed in either or both of the inner circumferential surface and outer circumferential surface of the sidewall portion. More particularly, when the fragile portion is formed as a notch in such a shape that extends along the axial direction of the cup-like member, only the side wall portion of the cup-like member is reliably ruptured, which is preferable. In addition, in such a gas generator, because the fragile portion is formed as the portion through which gas discharges during the activation, it is preferably provided evenly in the circumferential direction of the cup-like member. That is, where an n (number) of fragile portions are formed, it is preferable that angular fragile portions be provided in such a way as to ensure that the inner angle of adjacent fragile portions satisfies the relational expression "$360°/n$". Further, it is preferable that the direction of discharge of the gas and the amount of discharge thereof be adjusted in such a way that the resultant forces of the propulsion (vector) generated by the discharged gas are essentially zero. This is because, by providing the fragile portions in this way, propulsion forces generated by the injected gas counteract each other and the gas generator is prevented from jumping out. At the same time, a fixing means for a gas generator used in a pretensioner or the like can be simplified since resistance to propulsion can be disregarded. However, if the gas generator is disposed to be able to suppress the propulsion forces generated by the injected gas during the activation and to resist thereto, for example, by firmly fixing the gas generator to a predetermined position, the fragile portion can be provided unevenly in the circumferential direction of the cup-like member. When the fragile portion is provided unevenly in the circumferential direction of the cup-like member, the gas can be discharged more in the direction in which the fragile portions faces, which is preferable.

The above present invention provides a rupturable member to be ruptured by pressure, an impact wave or the like, the rupturable member in which unreproductive rupturing or unintended rupturing (rupturing beyond the tip end of the notch) does never occur, a rupturing manner of the rupturable member is optionally controlled and the reproductivity and stability in the rupturing manner is improved, and the rupturable member in which no fine fragments is generated due to rupturing.

When such a rupturable member is used in a variety of gas generators such as, for example, for an air bag or for a pretensioner, the generation of fragments and so on can be prevented by regulating the rupturing manner, and thereby, a gas generator, in which no fragments blocks the gas passage, and that realizes a stable operation performance, can be obtained.

DETAILED DESCRIPTION OF THE INVENTION

Figure 1:
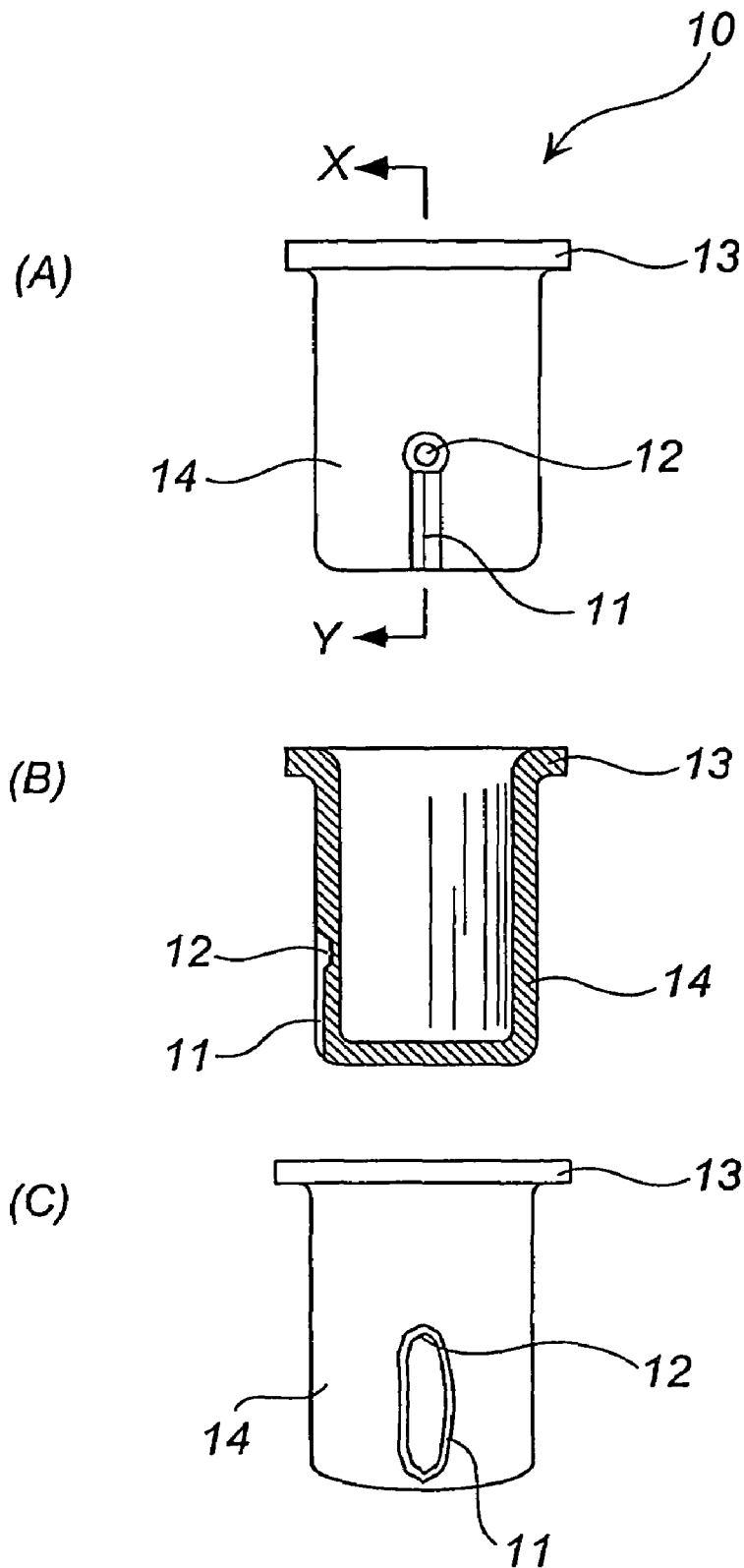
FIG. 1 shows an embodiment of a rupturable member formed in a cylindrical shape with the bottom: (A) is a side view thereof, (B) is a cross sectional view along the arrow X-Y thereof, and (C) is a schematic view showing the ruptured state thereof.
Figure 2:
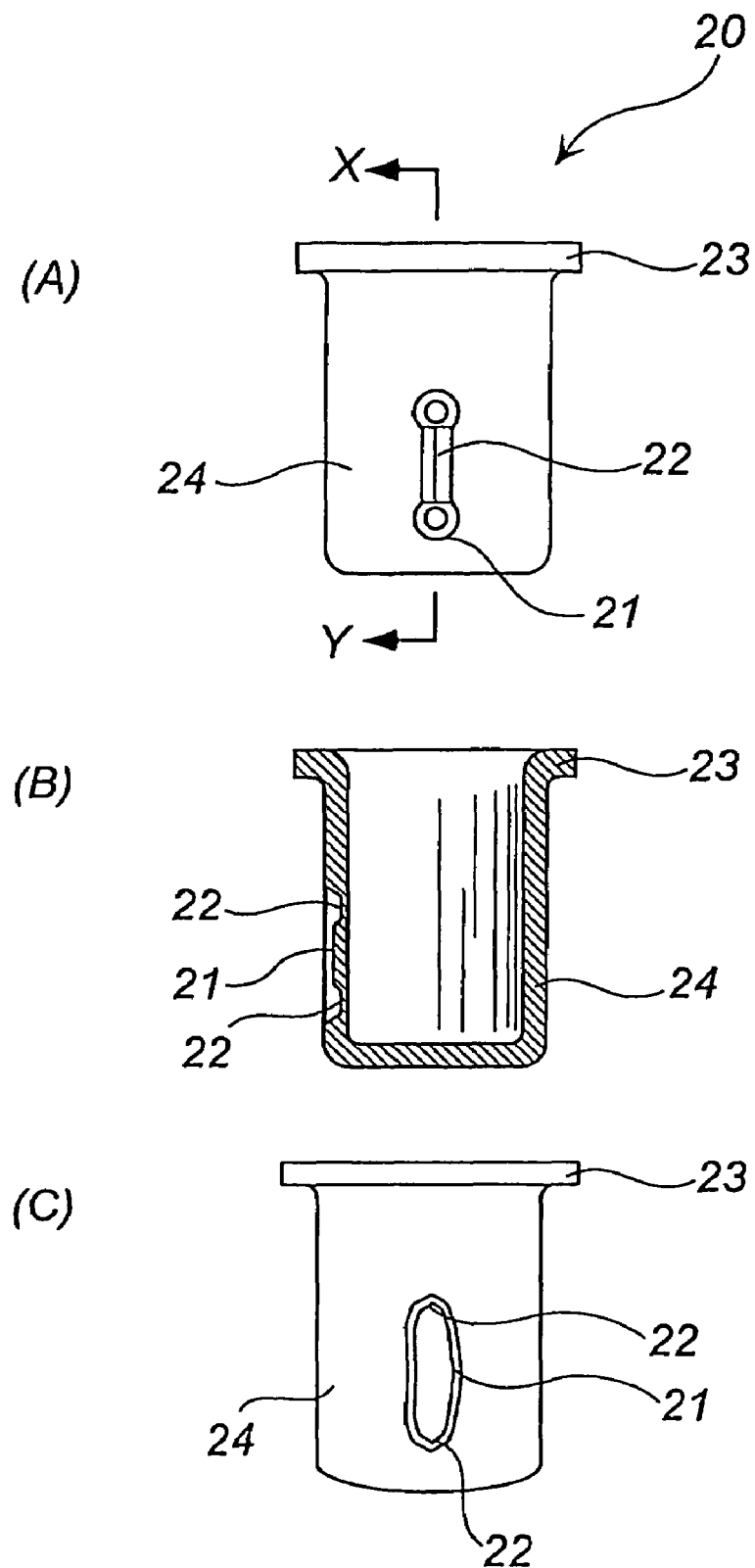
FIG. 2 shows another embodiment of a rupturable member: (A) is a side view thereof, (B) is a view along the line X-Y thereof, and (C) is a schematic view showing the ruptured state thereof.
Figure 3:
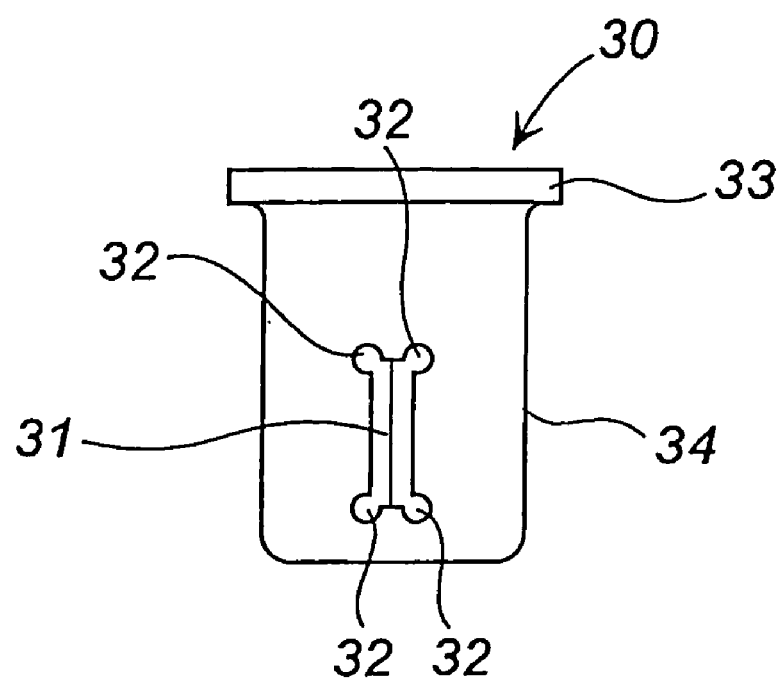
FIG. 3 is a side view of a rupturable member comprising another fragile portion and stress dispersion portion.
Figure 4:
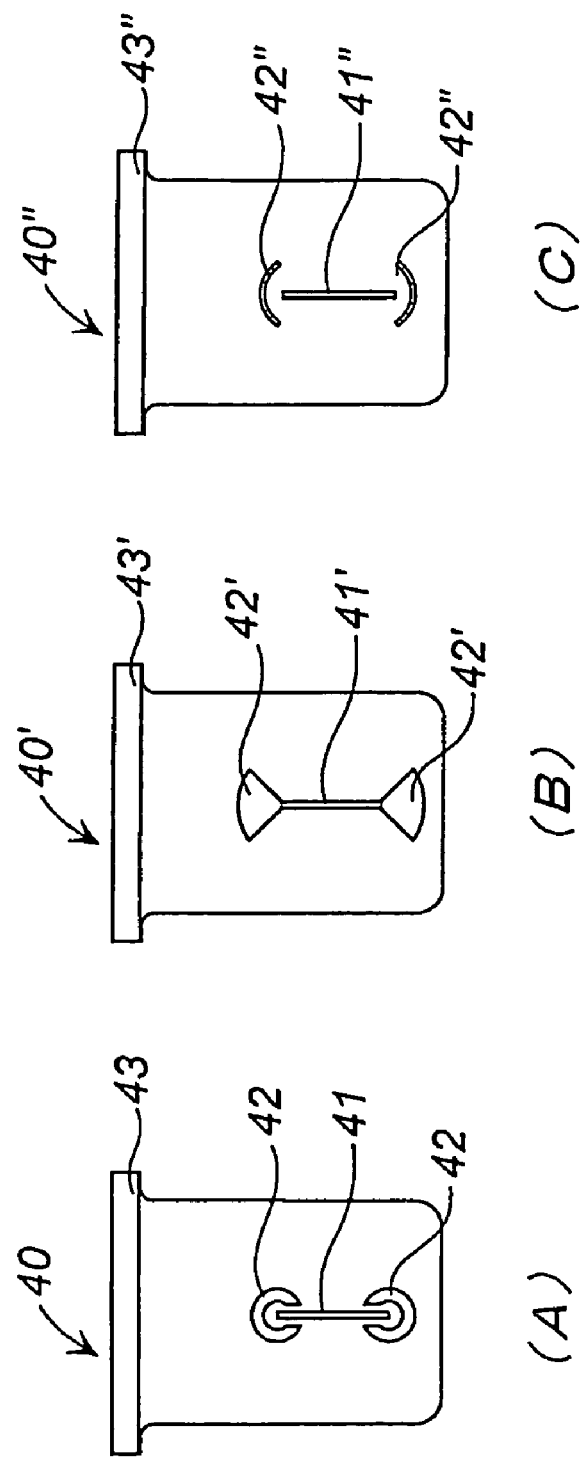
FIG. 4 is a side view of a rupturable member comprising still another fragile portion and stress dispersion portion.
Figure 5:
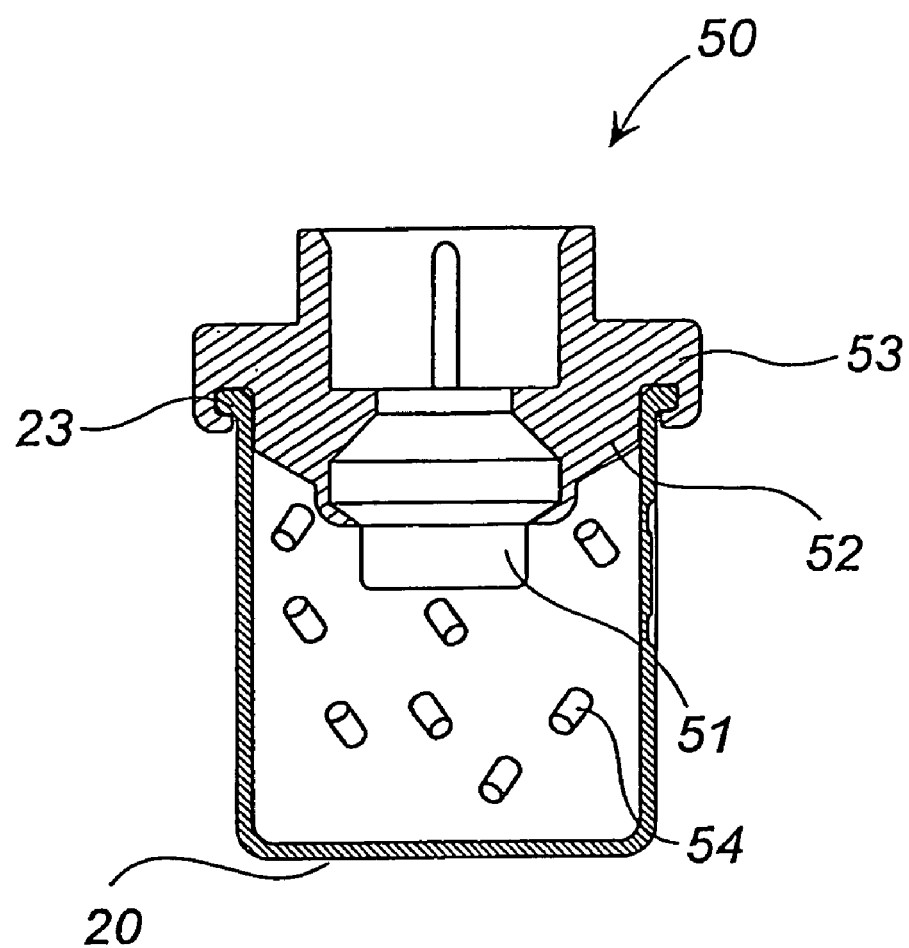
FIG. 5 is a cross sectional view of the gas generator formed by the employment of the rupturable member in FIG. 2.
Figure 6:
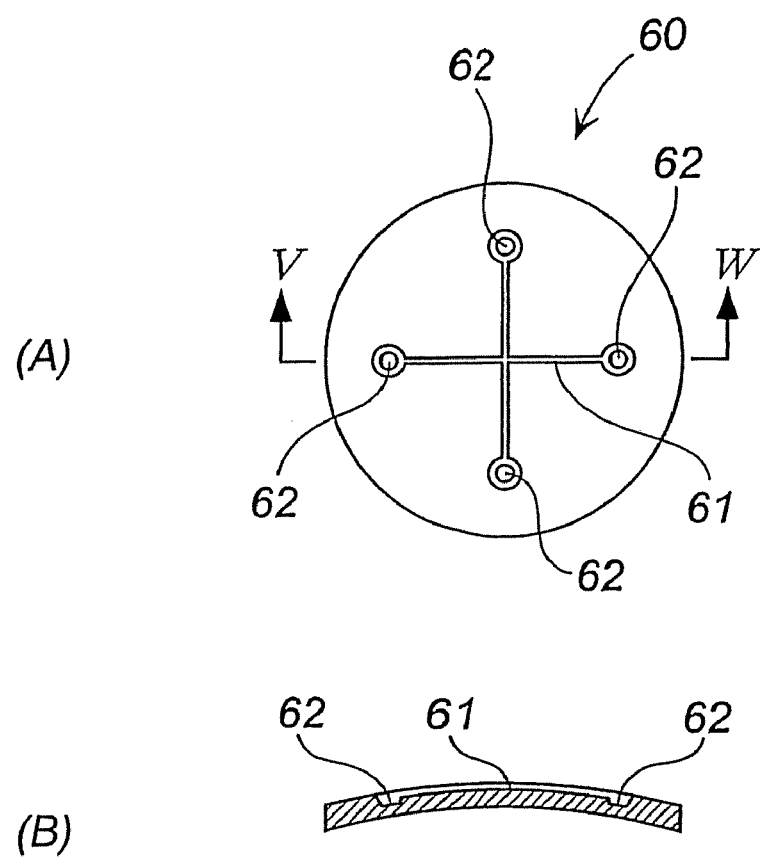
FIG. 6 shows an embodiment of a rupturable member formed in a spherical shape: (A) is a front view thereof, and (B) is a cross sectional view along the line of the arrows V-W thereof.
Figure 7:
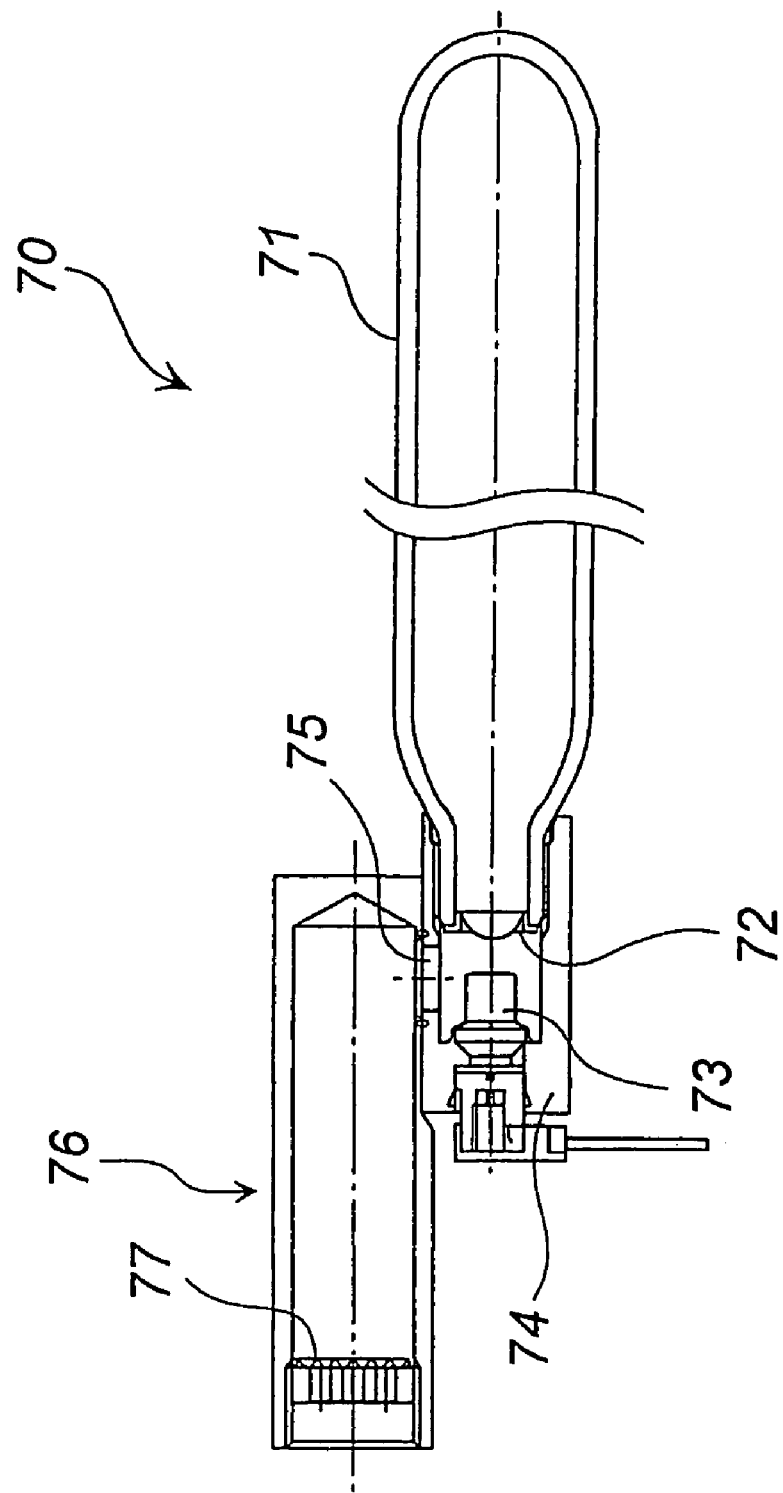
FIG. 7 is a cross-sectional view of the gas generator formed by the employment of the rupturable member in FIG. 6.

With reference to the drawings, embodiments of the present invention will be described. FIG. 1 shows an embodiment of a rupturable member 10 formed in a cylindrical shape having a bottom, and FIG. 2, FIG. 3 and FIG. 4 show embodiments of a rupturable member 10 including a different fragile portion and a stress dispersion portion from these of the rupturable member 10 shown in FIG. 1, which pertain to the rupturable member 10 shown in FIG. 1. FIG. 5 shows a gas generator in which the rupturable member 10 of a cylindrical shape having the bottom is employed. FIG. 6 shows a rupturable member 10 formed in a spherical shape, and FIG. 7 shows a gas generator in which a rupturable member 10 of a spherical shape is employed.

In FIG. 1, (A) is a side view of rupturable member 10 of the embodiment, formed in a cylindrical shape having the bottom, (B) is a cross section along the arrow X-Y thereof, and (C) is a schematic view showing the ruptured state of a fragile portion (groove 11).

The rupturable member 10 shown in FIG. 1 is formed in a cylindrical shape having one end closed. And the other end thereof is opened, provided with an outward-facing flange portion 13. Further, a groove 11 having a less thickness than the rest of a side wall portion 14 is formed along an axial direction of the rupturable member 10 in the side-wall surface thereof, and at the end of the groove 11 in the flange portion 13 side, a circular shape, for example, a regular circle hollow portion 12 which is deeper than the groove 11 (that is, of thinner wall thickness) is formed, connected with the groove 11. The opposite end of the groove 11 where the hollow portion 12 is not formed reaches a bottom surface (the closed end portion) of the rupturable member 10.

In the rupturable member 10 of this aspect, the groove 11 is formed to be more fragile with respect to pressure or an impact wave than the rest of the side-wall portion 14 (that is, the side-wall portion 14 in which there is no groove 11 or hollow portion 12 formed) and, accordingly, the groove 11 functions as a fragile portion. Meanwhile, the circular hollow portion 12 formed at the end of the fragile portion (groove 11) is formed to have a still less thickness than the groove 11, in the rupturable member 10, so that this portion functions as a stress dispersion portion.

If, for example, pressure or an impact wave acts on the rupturable member 10, formed as the above, from the inner side, the circular hollow portion 12 (stress dispersion portion) ruptures first and either very slightly thereafter or almost simultaneously, the groove 11 formed in the wall surface (fragile portion) ruptures. This ruptured state is shown in FIG. 1 (C).

As to the rupture of the groove 11, the stress of the rupturing is concentrated along the direction in which the groove 11 extends, but, the stress is dispersed by the above circular hollow portion 12 (stress dispersion portion), so that no additional progression of the rupturing towards the flange portion 13 beyond the above circular hollow portion 12 (stress dispersion portion) occurs. It should be noted that, although in FIG. 1 the fragile portion (groove 11) and stress dispersion portion (hollow portion 12) are integrally formed, the stress dispersion portion (hollow portion 12) may be formed separately in the progressing direction of the rupturing of the fragile portion (groove 11).

In addition, although the stress dispersion portion (hollow portion 12) is formed in the flange portion 13 side in the fragile portion (groove 11) in the aspect shown in FIG. 1, conversely thereto, it can be formed in the closed end portion side of the rupturable member. That is, it is a rupturable member in which the stress dispersion portion (hollow portion 12) is formed only in the closed end portion side of the rupturable member between the end portions in the longitudinal direction of the fragile portion (groove 11). If formed in this way, the rupturing of the rupturable member generated along the direction in which the fragile portion extends can be blocked by the stress dispersion portion in the closed end portion side and it can be blocked by the flange portion 13 in the flange portion 13 side. Furthermore, when the stress dispersion portion is formed only in the closed end portion side in this way, it is preferable that the flange portion thereof be formed to have a strength that can block the rupturing of the rupturable member, for example, that the thickness of the flange portion be increased and, preferably, that it be formed thicker than the side wall of the rupturable member.

Next, a rupturable member 20 shown in FIG. 2 will be described. FIG. 2 (A) is a side view of another embodiment of a rupturable member 20, (B) is a view along the line X-Y thereof, and (C) is a schematic view showing the ruptured state of a fragile portion (groove 21). More particularly, the rupturable member 20 shown in FIG. 2 includes a different fragile portion and a stress dispersion portion from these of the rupturable member 10 shown in FIG. 1, which pertain to the rupturable member 10 shown in FIG. 1.

The rupturable member 20 shown in FIG. 2, similarly to the above rupturable member 10 shown in FIG. 1, is also formed in a cylindrical shape with a bottom, and which an outward-facing flange portion 23 is formed in an opened end portion, and a groove 21 (fragile portion) is formed along an axial direction of the rupturable member 20 in the side-wall surface thereof. However, a circular shape, or preferably a regular circle hollow portion 22 (stress dispersion portion) formed even deeper than the groove 21 (in other words, formed with thinner wall thickness) is provided in both ends in the length direction of the groove 21 (fragile portion) shown in this aspect, and the fragile portion (groove 21) is interposedly formed between two stress dispersion portions (hollow portions 22). It should be noted that, also in this aspect, the stress dispersion portions are formed to have a less wall thickness than the fragile portion.

If, for example, pressure or an impact wave acts on such a rupturable member 20 from the inner side thereof, the circular hollow portions 22 (stress dispersion portions) in both ends of the groove 21 rupture first and either very slightly thereafter or almost simultaneously, the fragile portion (groove 21) ruptures. This ruptured state is shown in FIG. 2 (C).

Particularly, if a stress dispersion portion (hollow portion 22) is formed in both sides of the fragile portion (groove 21) as in the rupturable member 20 shown in this aspect, even if the stress of the rupturing blocked by the one stress dispersion portion (hollow portion 22) acts on the other end side of the fragile portion (groove 21), it is blocked by the other end side stress dispersion portion (hollow portion 22), and therefore, the extent of rupturing of the fragile portion (groove 21) can be more reliably regulated when the rupturable member 20 is ruptured. In the embodiment shown in FIG. 2, in the same way as the embodiment shown in FIG. 1, the fragile portion (groove 21) and stress dispersion portion (hollow portion 22) may be arranged separately in the progressing direction of the rupturing.

In addition, FIGS. 3 and 4 are side views of rupturable members 30 and 40 including another different fragile portions and stress dispersion portions. The fragile portions and stress dispersion portions of FIGS. 3 and 4 are formed to have a less wall thickness than the rupturable members 30 and 40 (that is, the wall thickness of the rupturable members is made thinner by the provision of a notch or the like), and the fragile portion and the stress dispersion portion can be formed with the same depth or with either the fragile portion of stress dispersion portion deeper than the other.

In the rupturable member 30 of the aspect shown in FIG. 3, a fragile portion 31 is formed in a rectangular shape and circular depressed stress dispersion portions 32 are integrally formed in the four corners thereof. That is the fragile portion 31 of this aspect is formed as a groove having constant thickness. In this aspect, the rupturing of the fragile portion 31 would expand from the four corners thereof without the provision of the stress dispersion portions 32, but, as a result of the formation of such circular stress dispersion portions 32, the stress of the rupturing expanding from the four corners of the fragile portion 31 is dispersed by these stress dispersion portions 32. A single circle to prevent concentration of the stress of rupturing may be provided in each of the both end portions of the fragile portion 31.

In addition, in the rupturable member 40 of the aspect shown in FIG. 4 (A), a fragile portion 41 is formed in long length or in a linear shape, and stress dispersion portions 42 hollowed in a horse-shoe shape are formed to enclose the end portions in the length direction of the fragile portion 41. In this aspect, even if rupturing occurs along the fragile portion 41 and subsequently extends over the terminal end of the fragile portion 41, the stress of this rupturing is dispersed by these stress dispersion portions 42 and the rupturing does not progress forward therefrom.

With relation to the aspect related to the rupturable member 40 shown in the above FIG. 4 (A), the shape of the fragile portion and stress dispersion portion can be formed in the aspects shown in FIGS. 4 (B) and (C). That is, in a rupturable member 40' shown in FIG. 4 (B), fan-shaped stress dispersion portions 42' having a thinner thickness can be integrally formed in the both sides in the length direction of a fragile portion 41' formed in long length or in a linear shape. The depth of the fan-shaped stress dispersion portion 42' is the same or deeper than the depth of the fragile portion 41', that is the thickness of the section, in which the stress dispersion portion 42' is formed, is formed to have the same thickness or thinner than the thickness of the section in which the fragile portion 41' is formed. Further, the arc side of the fan-shaped fragile portion 41' is arranged in a direction to cover the end portion of the fragile portion 41'. In this aspect as well, naturally, the fan-shaped stress dispersion portion 42' may be formed separately from the fragile portion 41' in the progressing direction of the rupturing.

In addition, as in a rupturable member 40" shown in FIG. 4 (C), in both sides in the length direction of a fragile portion 41" formed in long length or in a linear shape, arc-shaped thinner stress dispersion portions 42" can be formed with a certain interval to the end portion in the length direction of a fragile portion 41". The depth of these stress dispersion portions 42" can be formed to be the same or deeper than the depth of the fragile portion 41" and, further, the arc-shaped stress dispersion portions 42" can be arranged in a direction such that the arc side thereof covers the end portions of the fragile portion 41". In this aspect, naturally, the arc-shaped stress dispersion portions 42" can be integrally provided in the fragile portion 41".

In the rupturable members shown in the above FIG. 3 and FIGS. 4 (A) to (C), the stress dispersion portion can also be formed in just a single side in the length direction of the fragile portions as shown in the above FIG. 1.

It should be noted that, in the aspects shown in the above FIGS. 1 to 4, the fragile portions are formed into a substantially V-letter shape in a cross-section orthogonal to the length direction thereof, and the deepest section of the groove (base portion) is formed to have the same depth as the deepest section (base portion) of the stress dispersion portion, or the base portion of the stress dispersion portion is formed deeper than the base portion of the groove. However, the fragile portions of the aspects shown in FIGS. 1 to 4 can also be formed as a groove having a substantially flat base surface (that is, a groove formed in a rectangular shape in the cross-section orthogonal to the length direction of the fragile portion and having an equal depth). In addition, the stress dispersion portions of the aspects shown in the above FIGS. 1 to 4 can be formed in a semi-circular shape with a diameter equal to the width of the fragile portion connected thereto.

The rupturable members shown in the above FIGS. 1 to 4 can be optimally used, for example, in a gas generator 50 as shown in FIG. 5. Particularly, the gas generator 50 shown in FIG. 5 illustrates an example of a gas generator formed with the rupturable member 20 shown in FIG. 2, and in this gas generator 50, an electric-type igniter 51 that functions as an activation initiation device for the gas generator is supported by a metal collar member 52 comprising a shoulder portion that protrudes outwardly in the radial direction, the flange portion 23 in the opened end portion side of the cylindrical shaped rupturable member 20 with the bottom is integrally fixed to the shoulder portion 53 of the metal collar member 52, and a gas generating agent 54 which generates a gas with combustion is stored in the cavity portions of the rupturable member 20. The following is a description of the operation of the gas generator 50. When the igniter 51 is activated by an electrical signal (activating signal) supplied from an external control device not shown in the drawing (or power source supplying portion), the gas generating agent 54 is ignited and burned by the flame or the like generated by the activation and generates a combustion gas. As a result of the generation of combustion gas, the pressure in the inner space of the rupturable member 10 is raised and, as a result of this pressure, the stress dispersion portions (denoted as the numeral 22 in FIG. 2) formed in the circumferential wall surface of the rupturable member 10 ruptures and opens first and, thereafter, the fragile portion (denoted as the numeral 21 in FIG. 2) opens. In the rupturing and opening of the fragile portion, the stress for the rupturing and opening thereof is generated by the pressure and so on of the generated combustion gas, and the pressure is dispersed by the stress dispersion portions that are formed in both ends in the length direction of the fragile portion, so that the rupturing beyond the stress dispersion portions can be blocked.

More particularly, in the rupturable member 20 used in a gas generator such as that shown in FIG. 5, a thickness of the wall surface portion can be 0.2 to 1.5 mm, a thickness of the fragile portion can be 0.15 to 1.4 mm, and a thickness of the stress dispersion portions can be 0.1 to 1.3 mm. And, it is preferable that the stress dispersion portions in these aspects be formed, for example, in a circular shape having a radius of 1.0 to 6.0 mm.

FIG. 6 shows a rupturable member 60 of still another embodiment thereof, and FIG. 6 (A) is a front view of the rupturable member 60 and (B) is a cross section along the arrows V-W thereof. More particularly, the rupturable member 60 shown in this aspect is formed in a spherical shape, fragile portions 61 are formed to intersect with each other in a projecting upper surface thereof, and circular stress dispersion portions 62 are integrally formed in the respective end portions of the intersecting fragile portions. In the aspect shown in this drawing, the fragile portions 61 and stress dispersion portions 62 are formed to have a less thickness than the rupturable member 60 (that is, the thickness of the rupturable member 60 is reduced by the provision of a notch or the like), and the stress dispersion portions 62 are formed deeper than the fragile portions 61.

When pressure or an impact wave act on a single surface (upper surface or rear surface) of the rupturable member 60 shown in FIG. 6, the circular stress dispersion portions 62 ruptures first, and slightly thereafter or almost simultaneously the fragile portions 61 ruptures. Since the rupturing stress uniformly acts on the stress dispersion portions 62 and dispersed, the rupturing of the fragile portion 61 does not advance beyond the stress dispersion portions 62.

The spherical-shaped rupturable member 60 formed in this way can be used optimally, for example, in the gas generator shown in FIG. 7.

In a gas generator 70 shown in FIG. 7, an opening portion 72 of a pressurized container 71 charged with a compressed gas is closed by the rupturable member 60, and a collar member 74 for supporting the igniter 73 is provided to enclose the opening portion 72 side. A flow passage 75 through which the gas from the opening portion 72 flow is further provided with the collar member 74, and this flow passage 75 is connected to communicate with a diffuser 76 which guides the gas. In addition, a filter which filters solid materials and so on from the discharged gas is provided at the end of the diffuser 76.

The following is a description of the operation of the gas generator 70 formed in this way. When the igniter 73 is activated by an electrical signal (activating signal) supplied from an external control device (or power source supply portion) not shown in the drawing, the flame, pressure or an impact wave or the like produced by this activation act on the rupturable member and, as a result, the rupturable member 60 ruptures. In the rupturing thereof, since the stress dispersion portions 62 shown in the above FIG. 6 is formed in the rupturable member 60, rupturing to unintended sections can be prevented. As a result, a situation in which fragments or the like of the rupturable member 60 are generated can be eliminated and the stable action of the gas generator can be ensured.

The invention claimed is:

1. A rupturable member that ruptures due to pressure or an impact wave, comprising:
   a fragile portion that ruptures preferentially and regulates the rupturing direction of the rupturable member; and
   a stress dispersion portion having a shape or structure that disperses stress during the rupturing of the rupturable member, the stress dispersion portion being a concavity and formed only in an end of the fragile portion or only in a vicinity of and away from the end to prevent the rupturable member from rupturing beyond the stress dispersion portion,
   wherein the thickness of the rupturable member at the stress dispersion portion is formed to be less than the thickness of the rupturable member at a deepest portion of the fragile portion, and
   wherein the stress dispersion portion is fan-shaped.

2. A rupturable member that ruptures due to pressure or an impact wave, comprising:
   a fragile portion that ruptures preferentially and regulates the rupturing direction of the rupturable member; and
   a stress dispersion portion having a shape or structure that disperses stress during the rupturing of the rupturable member, the stress dispersion portion being a concavity and formed only in an end of the fragile portion or only in a vicinity of and away from the end to prevent the rupturable member from rupturing beyond the stress dispersion portion,
   wherein the thickness of the rupturable member at the stress dispersion portion is formed to be less than the thickness of the rupturable member at a deepest portion of the fragile portion
   wherein the fragile portion is formed in a linear shape, and the stress dispersion portion is provided in both ends in the length direction of the fragile portion formed in a linear shape, and
   wherein the stress dispersion portion is fan-shaped.

* * * * *